Nov. 26, 1963    D. C. GOFF    3,112,183
UNDERGROUND INSULATING CONDUIT
Filed Jan. 7, 1960
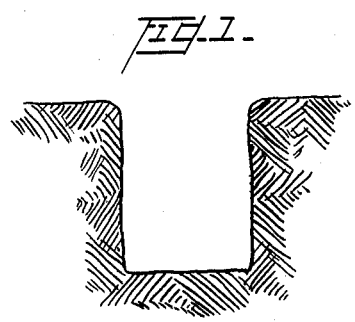
FIG.1.
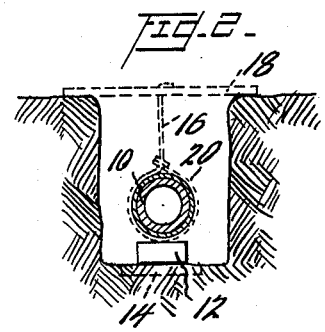
FIG.2.
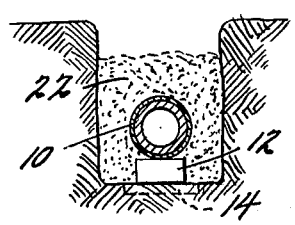
FIG.3.
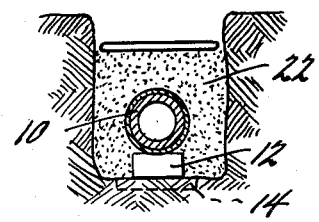
FIG.4.
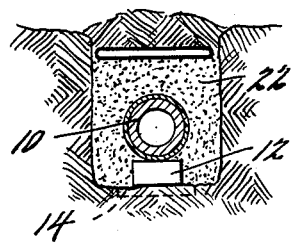
FIG.5.
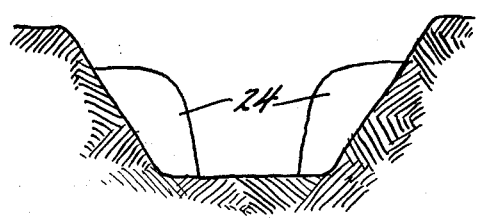
FIG.6.
FIG.7.
FIG.8.
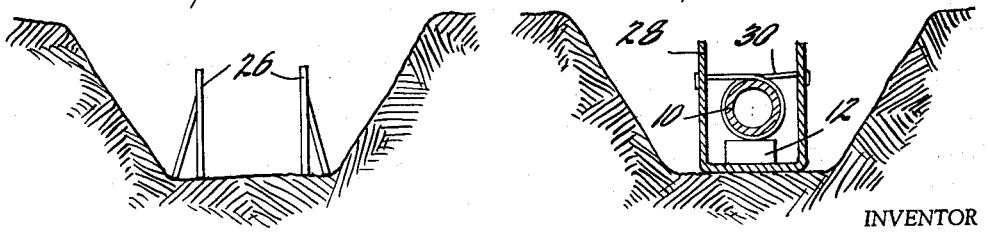
INVENTOR
David C. Goff
BY
Watson, Cole, Grindle & Watson
ATTORNEYS United States Patent Office — 3,112,183, Patented Nov. 26, 1963

3,112,183
UNDERGROUND INSULATING CONDUIT
David C. Goff, Fort Lauderdale, Fla., assignor, by mesne assignments, to Concrete Thermal Casings, Inc., Evanston, Ill., a corporation of Washington
Filed Jan. 7, 1960, Ser. No. 1,059
2 Claims. (Cl. 25—154)

This invention relates to underground insulated pipe systems.

The present invention provides new methods and means of insulating underground pipe, but is probably more closely related to the prior systems of the kind illustrated in Goff U.S. Patent No. 2,355,966, wherein a monolithic insulation is cast about the pipe at the job site, than to prefabricated systems, or others, which include protective encasements which are also designed to keep ground water from wetting the insulation employed.

Although the system of the present invention deals with ground water differently than the systems of either of these two general divisions of the prior art, the advantages and objects of the invention are best illustrated by comparison with prior systems in which the insulation is poured about the pipe at the job site. In such prior systems, the insulation generally comprised an insulating concrete made up of a cementitious binder such as Portland cement, and an insulating aggregate which generally was a light-weight material such as expanded vermiculite or pearlite, etc., air bubbles, or rubber particles, or other material having substantially better insulating qualities than hydrated Portland cement. Such insulating materials were regarded as forms of concretes, and consequently were made up with water, generally in mixers, and this entailed the skilled supervision usually provided for making concrete mixes wherein the proportion of water employed, as well as the proportions of other materials, affected the pouring, insulation and strength characteristics of the finished concrete. The installation of such systems was most generally done by contractors who were skilled in making concretes and, of course, concrete mixing and pouring equipment were required at the job site. One of the objects of the present invention is to provide method and means for insulating underground pipe with insulation poured about the pipe at the job site which does not entail the use of machinery at the job site or skilled supervision, or means for protecting the insulation from ground water. The invention provides, therefore, an underground insulated pipe system which may be installed at low cost by unskilled labor and without expensive equipment.

In general, these objects and advantages are accomplished by pouring about the pipe at the job site, and covering with backfill, a dry material which has good insulating properties when dry (or as poured), and which when later wetted, by ground water for example, will form a solid, permanent mass which also has satisfactory insulating properties. If the later wetting of the material is complete, the entire body of the poured material will be so converted, while if incomplete, only a portion will be so converted with the remainder exhibiting the satisfactory insulating properties of the material as originally poured.

The accompanying drawing and following detailed descriptions, and specific examples, are examplary only, but will serve to disclose what is presently contemplated as the best mode of practiicng the invention. This, of course, will involve details which may be omitted or changed, as those skilled in the art will understand, without departing from the spirit of the invention.

The method and conduit system according to the present invention is exemplified by the one form which is specifically illustrated in the drawings and described hereinafter. It will be understood that this invention is directed primarily to an underground insulating conduit, and that the invention may be employed in connection with any pipe system which is properly designed and which utilizes conventional methods of dealing with pipe expansion and contraction, as well as means for anchoring the pipe, all as well understood in the art.

In the drawings:

FIGURE 1 is a transverse cross section through a trench which has been excavated to receive an underground insulated pipe system;

FIGURE 2 is a similar transverse cross section through the same trench showing a pipe positioned in the trench and prepared for having the underground insulation poured about it;

FIGURE 3 is a view similar to FIGURE 2 in which the insulating material is shown poured about the pipe;

FIGURE 4 is a similar view showing a variation of the invention in which the bag container of the insulating material is positioned above the insulating material which has been poured into the trench;

FIGURE 5 is a similar view showing the backfill placed over the insulating material;

FIGURE 6 is a transverse vertical section through another type of trench which has been prepared to receive an underground insulated pipe system;

FIGURE 7 is also a transverse vertical section through another type of trench and forming members which have been prepared to receive an underground insulated pipe system; and FIGURE 8 is also a vertical transverse section through a trench and a further kind of forming member in which a pipe of an underground insulated system has been positioned preparatory to having insulating material poured about it.

In constructing an underground insulated pipe system of the type provided by this invention, it is preferable to excavate a trench having vertical side walls, such as shown in FIGURE 1, and to have the width of the trench such that the distance between either side of the pipe and the adjacent side of the trench corresponds to the thickness of the insulation which is wanted around the pipe. Constructing a trench in this manner makes it unnecessary to provide side forms into which the insulation is poured, and therefore reduces the cost of installing the system. It will be understood that in certain ground conditions an excavation of this kind of the desired depth and width cannot be formed, and in such instances the method and means shown by way of example in FIGURES 6–8 may be employed. These will be described hereinafter.

When the present invention is employed in connection with large installations of underground pipe systems, where the pipes may extend for several hundred feet or more, expansion and contraction compensating means, with anchorages therebetween, would be provided in accordance with conventional practice. For shorter runs, especially in systems employing pipe of four inches or less in diameter, anchorages or expansion and contraction means outside of the buildings between which the system extends may be unnecessary, but this would be determined by the conventional design of pipe systems themselves.

Referring to FIGURE 2, a pipe 10 is shown positioned in a trench preparatory to having formed about it a conduit according to the present invention. The pipe is positioned above the bottom of the trench a distance corresponding to the thickness of insulation which it is desired to have between the bottom of the pipe and the bottom of the trench. In FIGURE 2, the pipe is shown being held in this position by means of a series of blocks 12 which may be formed, preferably, of an insulating material such as, for example, insulating concrete. In the event that the bottom of the trench is soft, a board 14, having an area larger than the bottom area of the block 12, may be first placed in the trench and the block 12 rested thereon. It will be understood that the pipe may be supported in the position shown by other devices as desired, such as, for example, by suspending it from above on wires 16 held by cross pieces 18 laid at intervals along the trench, both being shown in dotted lines in FIGURE 2. The pipe shown in FIGURE 2 is covered with a parting medium 20 which may consist of a layer of rosin paper, corrugated paper, or a grease-type lubricant, which will prevent adherence between the pipe and the insulating mass which may be later formed about the pipe.

Once the pipe is positioned and prepared as illustrated in FIGURE 2, the insulating material may then be poured about it in the form of a dry mix as 22 shown in FIGURE 3. According to this invention, this insulating material is one which, when placed dry about the pipe, will provide insulation for the pipe, and which when wetted will take up water to form a solid permanent insulation for the pipe.

One example of a material which will perform in this manner consists of an intermixture of expanded vermiculite and Portland cement in the proportions by volume of one cubic foot of Portland cement to six cubic feet of expanded vermiculite. This mixture, when dry, has a satisfactory insulating value due to the presence of the expanded vermiculite. When this mixture is subsequently wetted by ground water, or otherwise, the Portland cement thereupon hydrolyzes to provide an insulating concrete which is a permanent insulation for the pipe. A satisfactory insulating value of the dry material is indicated by the fact that its weight would vary between about 20 to 30 pounds per cubic foot. Upon hydration of the Portland cement, an insulating concrete is formed which weighs between about 23 to 35 pounds per cubic foot, again indicating a satisfactory insulation value.

It will be understood that various other dry mixtures may be used which upon wetting form a solid permanent insulation. For example, expanded materials such as perlite, shale, etc., air bubbles or rubber particles may be used in lieu of expanded vermiculite. Further, special grades of Portland cement may be employed to increase the resistance to water penetration by the solid permanent insulation which is formed upon initial wetting as, for example, Portland cement having waterproofing stearates or other water proofing agents. The insulating filler, for example, the vermiculite, may be also treated to improve the resistance to water penetration by the solid permanent insulation by coating the particles with pitch or asphalt, or similar bituminous materials.

FIGURE 4 indicates a variation of the invention in which the bag from which the insulating material has been poured is laid over the top of the material prior to backfilling. This has the advantages of disposing of the bag, and preventing dirt from sifting into the insulating material, but will not materially prevent the penetration of water which acts to set up the insulating material.

FIGURE 5 shows the trench backfilled, which may be the last step in the installation of the system. The system may then be left without further attention, and in areas having moderate rainfall, ground water will seep through the trench walls and provide the water of hydration needed to set up the Portland cement. In the meantime, the dry material serves as a satisfactory insulation for the pipe. If the ground water is insufficient in amount to hydrate the entire body of Portland cement, the insulation value of the system is nevertheless satisfactory, since both the hydrated and the dried portions of the material have satisfactory insulating properties.

If desired, after the backfill is placed as shown in FIGURE 5, the backfill may be wetted in order to aid in tamping it in position, and this water will also serve to hydrate at least a portion of the Portland cement in the insulating material. In dry areas, it may also be desired to spray water into the insulating material as it is being poured into the trench, or to spray water over the covered material when the installation has progressed to the stage shown in FIGURE 3 or 4. Any of these alternatives need be exercised only when local conditions are such that it is desirable to have the solid permanent insulation formed promptly as, for example, when the design of the system is such that the insulation is to provide at least some of the support for the pipe. Nevertheless, these alternatives may be exercised without the need for employing the conventional concrete mixing equipment.

FIGURE 6 illustrates how a trench may be formed in ground which is not sufficiently firm to cut the kind of a trench shown in FIGURE 1. In this instance, the trench is cut with receding side walls to give an angle of repose which will prevent the walls from crumbling. Some of the excavated earth is then replaced in the trench as at 24, to provide a trench of the width and depth desired therebetween. The installation then proceeds as described in connection with FIGURES 2–5.

FIGURE 7 shows a further alternative method of forming a trench in the earth which is not sufficiently firm to permit the excavation of vertical side walls. In this instance, light, upright forming members 26 are placed in the bottom of the trench at a distance from one another corresponding to the desired width of the conduit. The use of light forming members is permissible here, since the weight of the dry insulating material which is poured into the forms is comparatively light, as compared with wet concrete slurries, even of the lighter type which are employed in poor insulating concretes. This provides a further economic advantage for a system installed according to the present invention. The installation of the system into a trench of the kind shown in FIGURE 7 then proceeds as previously described in connection with FIGURES 2–5.

FIGURE 8 illustrates a further means and method of installing a system according to the present invention in a trench formed in earth which is insufficiently firm to permit an excavation of the kind illustrated in FIGURE 1. In this instance, sheets 28 of paper-covered wire mesh or wire mesh with paper interwoven, are bent into a U-shaped form, as shown in FIGURE 8. This sheet material may be of the kind known as "Steel Tex," manufactured and sold by the Pittsburgh Steel Company, Pittsburgh, Pennsylvania. Temporary support blocks 12 are placed in the bottom of the form thus provided, and the pipe held in position for pouring of the insulation material by positioning it upon these blocks, as explained earlier in connection with FIGURE 2. A wire 30 may then be turned about the pipe and fixed at either end to the upstanding edges of the wire mesh sheets to prevent them from being displaced when the insulating material is poured into the form. Here again, this light-weight, convenient form may be employed because of the relatively light-weight of the insulation material which is poured into it. Following the use of the form and pipe placement as shown in FIGURE 8, the installation then proceeds as described earlier in connection with FIGURES 3–5.

A specific application of the invention was made with a mix comprising thoroughly blended Portland cement and No. 4 vermiculite in proportions of 6 cubic feet of vermiculite to 1 bag (94 pounds) Portland cement. This mix was used as described above, in one instance being covered with backfill without addition of water and in the other being wetted before covering with backfill. After three weeks, during which some rain had occurred, both installations were set up firm. If desired, the water resistance of the concrete can be improved by the addition of two to three pounds, for example, of calcium stearate for each bag of Portland cement.

Other examples of suitable mixes are:

(1) Vermiculite or perlite _____ cu. ft__ 8
    Wyoming bentonite _____ lbs__ 100

| | | |
|---|---|---|
| Powdered pitch | lbs | 40 |
| (2) Vermiculite or perlite | cu. ft | 16 |
| Wyoming bentonite | lbs | 100 |
| Powdered pitch | lbs | 60 |

Where clay is used as a binder, the essential requirement is that there be enough clay present to form a layer which, even though wet, will be relatively impermeable to the continued passage of water through it. This holding back of the infiltration water will enable heat from the pipe to form or maintain a dry layer for insulation purposes next to the pipe inside the wet layer.

Also, improved mixes with respect to water-resistance are obtained by using aggregates treated as described in U.S. Patent No. 2,824,022 to Sucetti.

What I claim is:

1. The method of insulating underground pipe which comprises the steps of positioning said pipe in a trench in the earth in spaced relation from the sides and bottom of the trench, surrounding said pipe with a mixture of dry granular insulating material and a water-free particulate hydration settable cementitious binder, then allowing said mixture to absorb moisture from the earth to hydrate at least a portion of the said binder.

2. The method of insulating underground pipe which comprises the steps of positioning said pipe in a trench in the earth in spaced relation from the sides and bottom of the trench, surrounding said pipe with a mixture of dry granular insulating material and a water-free particulate hydration settable cementitious binder, then moistening said mixture to hydrate at least a portion of the said binder.

References Cited in the file of this patent
UNITED STATES PATENTS

| | | |
|---|---|---|
| 928,826 | Way et al. | July 20, 1909 |
| 1,403,352 | Smythe | Jan. 10, 1922 |
| 1,706,671 | Lotz | Mar. 26, 1929 |
| 1,792,855 | McRae | Feb. 17, 1931 |
| 2,007,969 | Grodsky | July 16, 1935 |
| 2,355,966 | Goff | Aug. 15, 1944 |
| 2,773,512 | Burk | Dec. 11, 1956 |
| 2,774,383 | Kidd | Dec. 18, 1956 |
| 2,779,161 | Pickman | Jan. 29, 1957 |
| 2,898,759 | Pebley | Aug. 11, 1959 |
| 2,901,775 | Goff | Sept. 1, 1959 |
| 2,972,968 | Stafford | Feb. 28, 1961 |